INVENTOR.
Robert C. Sneed
BY
ATTORNEYS.

FIG_3_

Dec. 20, 1955   R. C. SNEED   2,727,625
EGG GRADING MACHINE

Filed Aug. 13, 1951   6 Sheets—Sheet 6

INVENTOR.
Robert C. Sneed
BY
ATTORNEYS.

United States Patent Office 2,727,625
Patented Dec. 20, 1955

2,727,625
EGG GRADING MACHINE
Robert C. Sneed, Piedmont, Calif.

Application August 13, 1951, Serial No. 241,941

8 Claims. (Cl. 209—121)

This invention relates to egg handling and grading machines and is concerned particularly with machines of this character which grade eggs by weight and deliver the same to predetermined stations depending upon their weight to facilitate their subsequent handling and packaging.

Eggs are customarily delivered to egg handling and packaging plants in crates with no attempt having been made to segregate them as to size or grade. The eggs must be taken from the crates in which they are delivered, graded by weight, candled, packaged and ultimately placed in containers for delivery to wholesale and retail outlets.

It is an object of the present invention to provide an egg handling machine upon which eggs may be placed after having been removed from the original crates in which they are delivered, and which will grade the eggs by weight and deliver them to predetermined stations, depending upon their weight, at which station they may be further handled for other operations.

It is a further object of the present invention to provide a machine of the character described in which breakage of eggs and handling of eggs is reduced to a minimum.

It is a further object of this invention to provide a machine of the character described which is compact in size and requires the minimum of floor space.

It is a further object of the present invention to provide a machine of the character described which is fast in its operation and which is highly accurate.

It is a further object of this invention to provide a device of the character described whose speed of operation may be quickly and accurately adjusted to correspond to the speed of the operator.

It is a further object of the present invention to provide a device of the character described which will operate with any size of egg and which may be easily cleaned in the event an egg happens to be broken.

Another object of the present invention is to provide a conveyor device which will handle any number of eggs of any size, which will center them longitudinally and laterally and which will deliver them to a weighing apparatus.

Further objects and advantages of the present invention will be apparent from the following description of a preferred embodiment of the same as illustrated in the accompanying drawings in which.

Generally speaking the machine consists of five units. The first unit consists of a longitudinal or multiple file conveyor mechanism upon which eggs may be placed when they are taken from the crates in which they are delivered. The conveyor is designed to center the eggs longitudinally and laterally and to transport them from the point at which they are placed thereon to the second unit which is a transverse or single file conveyor.

The transverse or single file conveyor is positioned at one end of the longitudinal conveyor and is adapted to receive eggs therefrom and feed them one at a time to the third unit, the weighing mechanism.

The weighing mechanism is aligned with the transverse conveyor and consists generally of a rotating turret upon which a plurality of balance scales are mounted which determine the weight of the eggs deposited therein and which discharge the egg at a particular station upon the fourth unit, the carry-off conveyor.

The carry-off conveyor consists of a generally horizontal conveyor adapted to carry eggs from the place at which they are placed thereon to a candling and packaging station where an operator performs the quality grading operations and places the eggs in appropriately labeled cartons.

All of the first four mechanisms above described may be driven by a single drive mechanism comprising a motor and a combination of gear boxes and drives. All of the units, that is the longitudinal conveyor, the tranverse or single file conveyor, the weighing mechanism, the carry-off conveyor and the drive mechanism may be mounted upon any suitable framing or platform without departing from the spirit of my invention or in any way altering the same.

Figure 4:
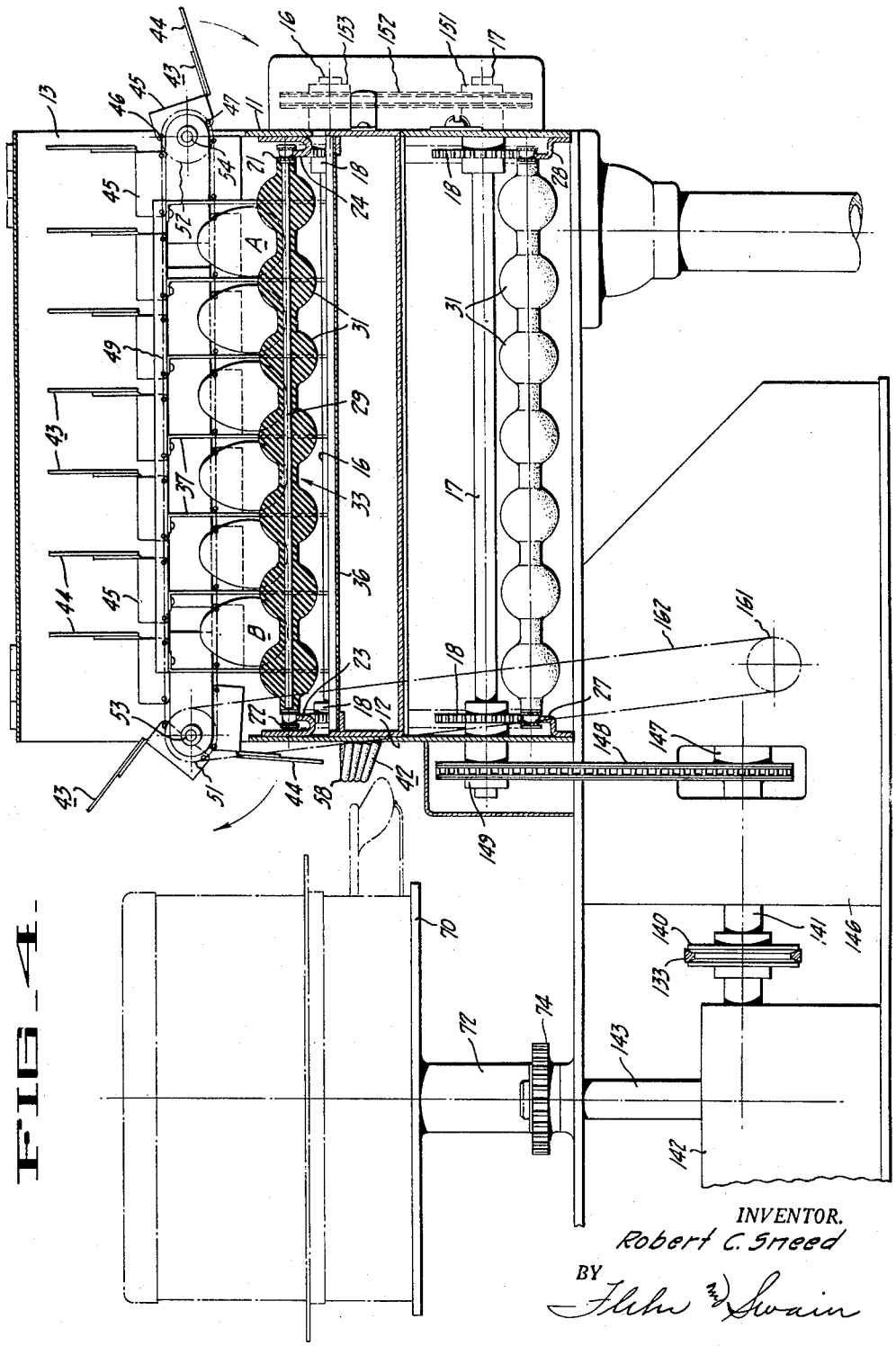
Figure 4 is a cross-sectional detail taken along the line 4—4 of Figure 1.

The longitudinal or multiple file conveyor is generally supported by a pair of vertical parallel side plates 11 and 12, which together with other parts, which will more fully hereinafter be described, form the framework for this machine. Side plates 11 and 12 are maintained in upright spaced apart relationship by an end plate 13 and a second corresponding end plate, not shown. Suitably journaled for rotation between the side plates 11 and 12 are a plurality of cross shafts 16, 17, which are driving shafts and other shafts, not shown, constituting idler shafts. Mounted on said shafts near the ends of the same and adjacent the inner sides of the parallel side walls 11 and 12 there are a plurality of sprockets 18 over which are reeved a pair of endless link chains 21 and 22, which are adapted to be driven by the sprockets 18 on the shafts 16 and 17, and which are adapted to be reeved over similar sprockets upon the idler shafts, not shown. Those portions of the link chains 21 and 22 which form the upper runs are supported by identical parallel rails 23 and 24 on side plates 12 and 11 respectively while those portions of chains 21 and 22 which form the lower runs thereof are supported by the members 27 and 28 suitably secured to side walls 12 and 11 respectively, as shown in Figure 4.

Rotatably mounted with respect to said chains 21 and 22 and extending therebetween I have provided a plurality of lateral members 29 which are adapted to be driven by the chains 21 and 22 and to be supported against downward movement by the rails 24, 25, 27 and 28 respectively.

The lateral members 29 are spaced an equal distance apart from each other and each of them is provided with a plurality of enlarged spherical portions 31 substantially as shown. The areas between adjacent bars 29 and adjacent spherical portions 31 provide a number of egg retaining nests or pockets serving to align the eggs laterally between the adjacent members 29 and longitudinally between adjacent rows of spherical portions 31.

As eggs are placed upon the longitudinal belt 33 formed by the chains 21 and 22 and the transverse rods 29, they are centered both longitudinally and laterally and are adapted to be moved longitudinally with respect to the machine toward the transverse conveyor mechanism previously referred to. The conveyor belt 33 so formed is moved intermittently or step-by-step whereby a single row of eggs between adjacent rods 29 will be delivered from the end of the conveyor 33 to the transverse conveyor mechanism. When a row of eggs has been transferred to the transverse conveyor mechanism, the longitudinal conveyor 33 stops until the transverse conveyor mechanism has cleared itself of the previously deposited eggs.

Immediately underlying the upper run of the multiple file conveyor belt 33 thus formed I have provided a plurality of removable pans 36 which are adapted to catch and retain any broken eggs and egg portions which would pass between the transverse rods 29 forming said upper run. The drawers 36 are mounted upon suitable guides suspended between the side walls 11 and 12 and are adapted to be drawn through cooperating openings in wall 11.

From the foregoing, therefore, it will be obvious that when eggs are placed upon longitudinal conveyor belt 33, said eggs will be advanced from the point at which they are placed upon said conveyor 33 to the opposite end thereof. It is obvious, also, since the sprockets 18 engage the chains 21 and 22 that the belt will be advanced upon rotation of the sprockets 18 which in turn are caused to operate by rotation of the cross-shafts 16 and 17. The means for driving the longitudinal belt 33, and the means of timing its drive, will be more fully hereinafter explained in connection with the operation of the driving mechanism for the entire apparatus.

Figure 2:
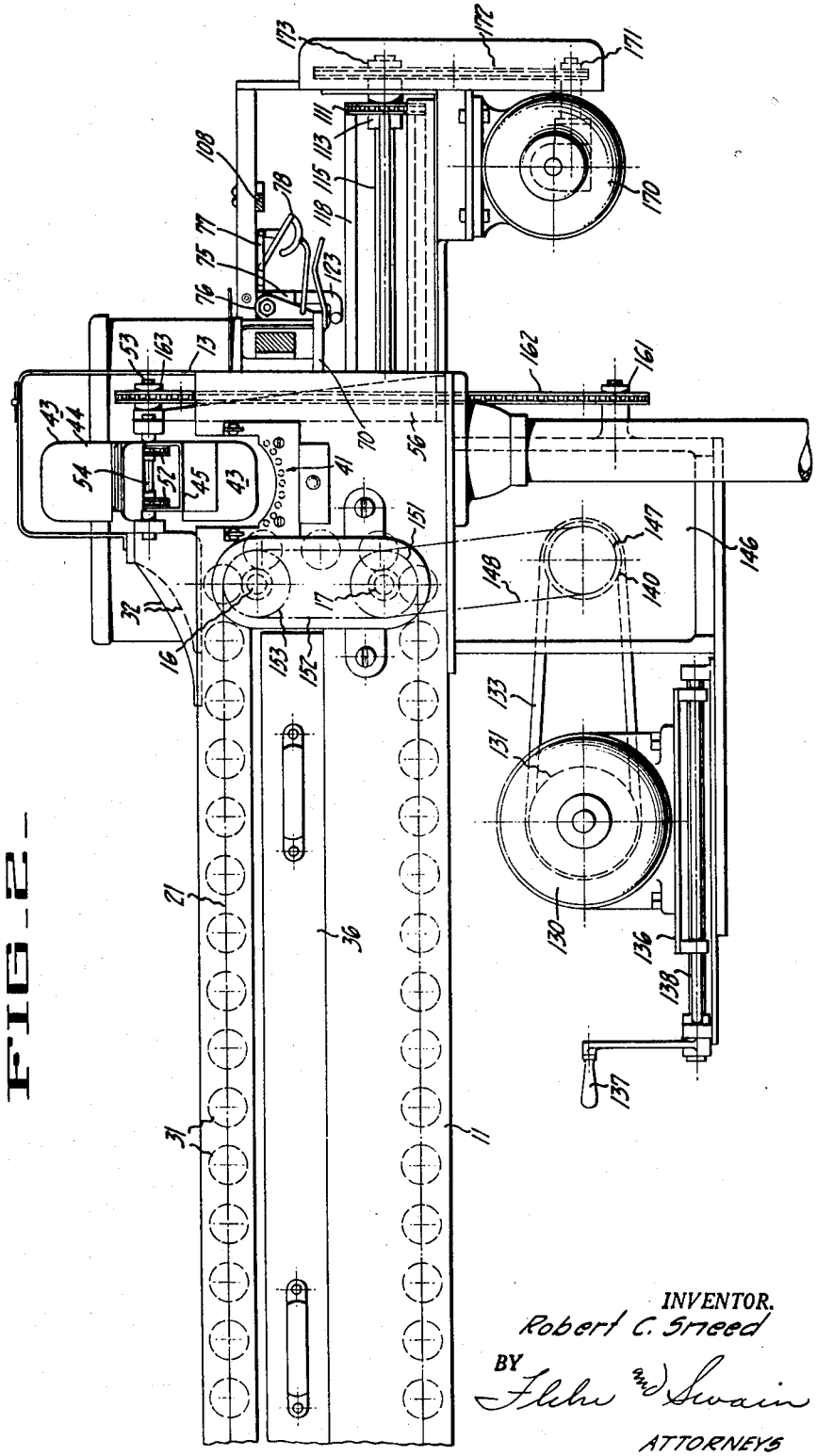
Figure 2 is a side elevational view of the machine shown in Figure 1.
Figure 3:
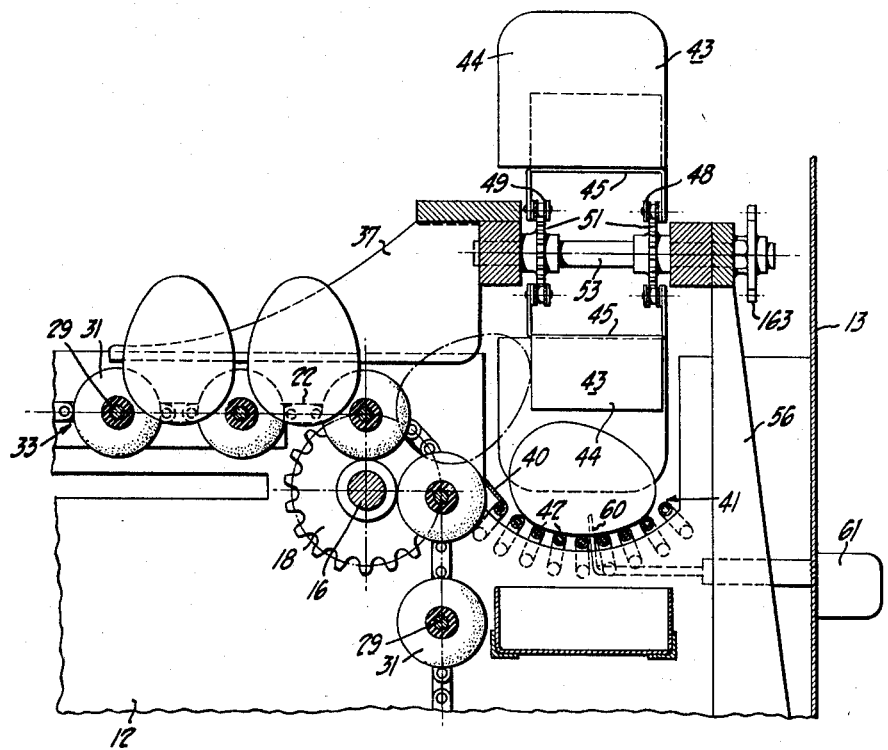
Figure 3 is a cross-sectional detail taken along the line 3—3 of Figure 1.

As is more particularly shown in Figures 2, 3 and 4, the transverse or single file conveyor mechanism lies at the extreme end of the longitudinal conveyor heretofore described and is adapted to receive eggs directly therefrom. As shown in Figure 3, the eggs are retained by the transverse rods 29 and spherical portions 31 and are advanced by reason of the rotation of shafts 16 and 17 and sprockets 18 about which the chains 21 and 22 are reeved. As the eggs approach the end of the conveyor 33 the eggs will pass between a plurality of vertical longitudinally extending members 37. It will be noted that the members 37 are of different lengths and staggered as indicated. The purpose of the members 37 is to further align the eggs which are retained between the spherical portions 31 on the transverse rods 29. In the event any of the eggs being carried by the advancing longitudinal conveyor 33 are out of alignment, even though retained between any four of the spherical portions 31, the eggs will strike one of the extending members 37 and will be gently moved to a position in which it will pass between them. Because of the staggered positioning of the members 37 the eggs will first be straightened in one direction and then the other and will not engage two of said members 37 simultaneously which would result in cracking or breaking of the egg. When the egg is in position, as shown particularly in Figure 4, it is ready to pass between the vertical members 37, and over the end of the longitudinal conveyor 33 into the transverse conveyor mechanism.

As the egg passes off the end of the longitudinal conveyor 33 it will first engage one of a plurality of small lip members 40 which will tend to trip the egg whereby it will adopt a substantially horizontal position in the transverse trough 41 which is composed of a plurality of horizontal parallel longitudinal rubber covered rods 42 along which the egg is adapted to be rolled. The machine is so timed that when the eggs pass from the longitudinal conveyor 33 between the members 37 and on to the trough 41 they will also pass between pairs of vertical pusher members 43 which are stationary at that time and are aligned with the members 37. The pusher members 43 are adapted to be moved transversely with respect to the longitudinal conveyor 37 previously described, and to roll the eggs along the trough 41.

The pusher members 43 are identical in form and each consists generally of an egg engaging portion 44 and a base portion 45 which is secured at two points 46 and 47, to endless chains 48 and 49 which are reeved about two pairs of sprockets 51 and 52, respectively, mounted upon cross-shafts 53 and 54.

The chains 48 and 49 and the pusher members 44 together with the sprockets 51 and 52 and the cross-shafts 53 and 54 are mounted upon the vertical member 56 which is suitably secured to the frame work of the machine, and which is adapted to retain the transverse conveying mechanism at a predetermined position with respect to the trough 41.

Figure 5:
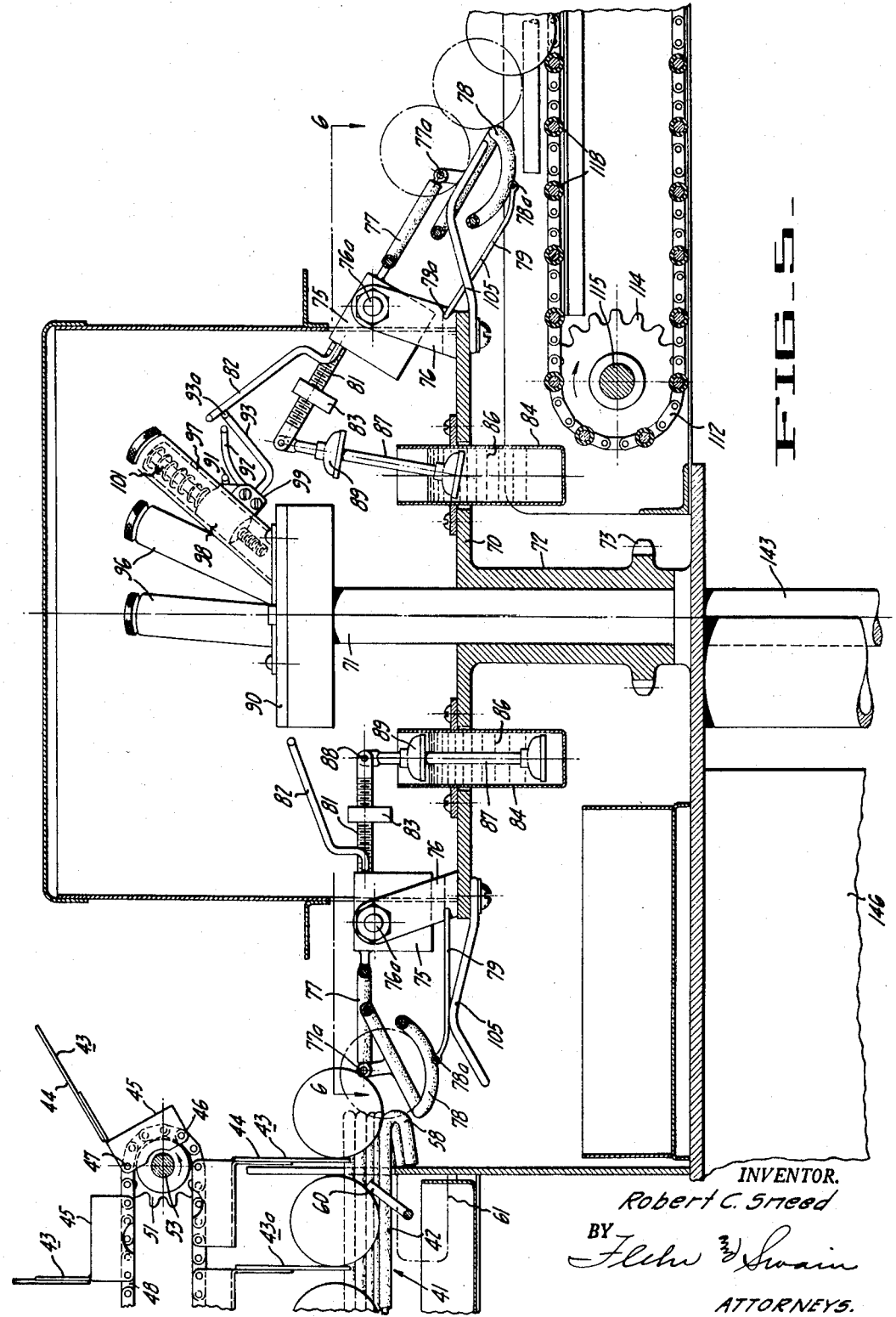
Figure 5 is a cross-sectional detail taken along the line 5—5 of Figure 1.

It should be pointed out that the sprocket 51 is driven by by shaft 53 which in turn is driven by the main driving mechanism of the machine in a manner to be hereinafter more fully described. It is sufficient to point out at this time, however, that the pushers 43 are advanced step-by-step and are not moving continuously and that for every row of eggs positioned between the transverse members 29 and deposited on the trough 41, the pushers 43 will advance six steps whereby, (at this point it should be noted that the conveyor 33 holds only six eggs in each lateral row whereby the maximum number of eggs deposited at one time upon the trough 41 is six), the transverse trough 41 will be cleared before another advance step of the conveyor 33 deposits another lateral row of eggs in the trough 41. The six eggs, or lesser number in the event all of the positions between the spherical members 31 were not occupied, is advanced one step, after which the pushers 43 and the eggs between them are halted. They are then advanced another step whereupon the leading member 43 will be raised about the axis of the shaft 53 and will permit the egg between it and the following member 43a (Fig. 5) to pass over the end 58 of the trough 41 on to the egg weighing mechanism. The remaining eggs and the pushers 43 will remain stationary as the egg clears the end 58 of the trough 41. The next step allows the following member 43a to likewise rotate about the axis of the member 53 and allow the following egg to likewise pass over the end 58 of the trough 41 on to the next succeeding basket of the egg weighing mechanism. When the last of the eggs which have previously been deposited on the trough 41 has been moved from a position in line with the eggs on the longitudinal conveyor 33 to a position at which it will pass over the end 58 of the trough 41 upon the next advancing step of the transverse pusher, then another row of eggs between adjacent rods 29 will be advanced between the vertical members 37 and the stationary members 43 and will likewise adopt horizontal positions on the trough 41 and between the vertical members 43. In this way the transverse conveyor will continue to deliver eggs over the end 58 of the trough 41 to the advancing egg weighing mechanism.

As the eggs are advancing along the trough 41 they will strike a trigger 60 and will depress the same thereby actuating a switch mechanism 61 which in turn will actuate a counting mechanism more fully disclosed in my co-pending patent application Serial No. 599,910, filed June 16, 1945.

Figure 1:
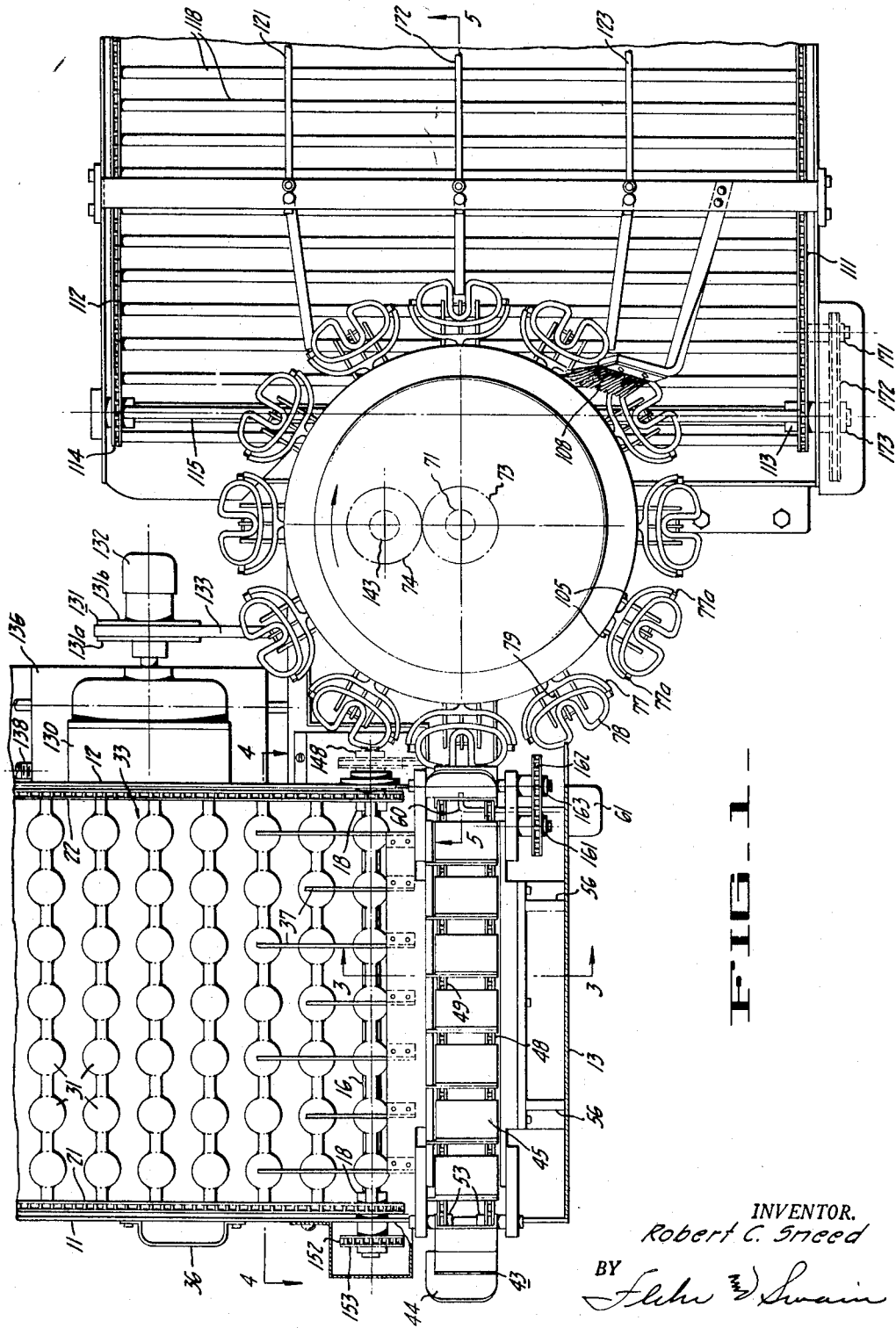
Figure 1 is a top plan view of a machine incorporating my invention.
Figure 6:
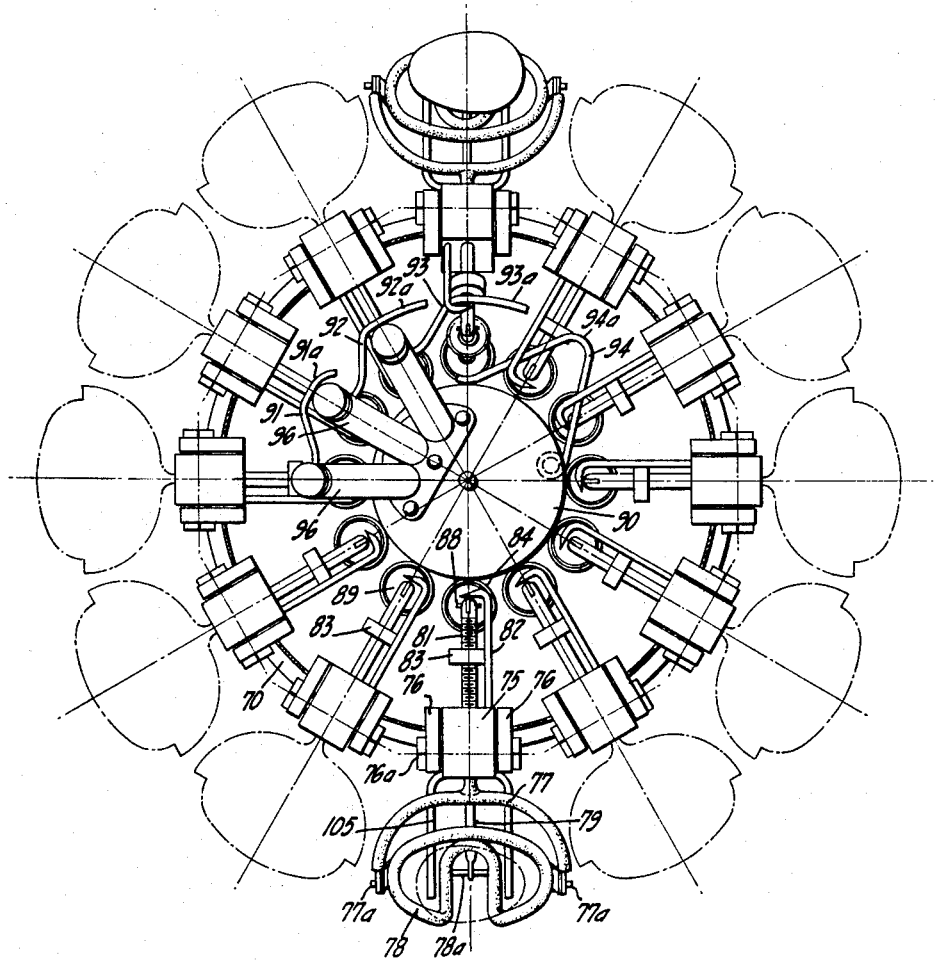
Figure 6 is an illustration of the weighing mechanism taken along the line 6—6 of Figure 5.

The egg weighing turret is generally aligned with the transverse conveyor as is shown in Figure 1. Generally speaking, and as is shown more fully in Figures 1, 5 and 6, the egg weighing turret is adapted to receive the eggs as they are ejected from the transverse conveyor, weigh the eggs, and discharge them at a predetermined point, depending upon their weight. The turret consists of a circular base plate member 70 which is rotatably mounted upon a vertical shaft 71 which is suitably secured to the frame. The plate 70 is provided with a suitable hub 72 and an integral gear 73 which meshes with a gear 74 driven by the central drive mechanism in a manner to be presently described.

Peripherally mounted about the plate 70 are a plurality, in the present instance 12, egg weighing baskets, each of which together with their cooperating mechanisms are identical. Therefore, only one of these baskets and its mechanism will be described in detail. The egg weighing apparatus consists of a block 75 which is pivotally mounted in a yoke 76 at 76a which is secured to the plate 70. On the outer face of the block 75 there is provided a second yoke 77 between the ends 77a of which there is moveably suspended a basket 78 formed generally as shown. The bottom of the basket 78 is secured to a link 79 at 78a which in turn is hingedly secured to the yoke 76 at 79a. The points 76a, 77a, 78a and 79a form a parallelogram whereby the egg retaining basket 78 is maintained in substantially the same relative position regardless of whether or not the egg retaining mechanism as a unit is tipped.

On that face of the block 75 remote from the egg retaining basket 78, I have provided a pair of extensions 81 and 82. It will be noted that member 81 is threaded and is provided with a nut 83 which, in this instance, is off-center whereby once the same has been set or properly positioned with respect to the member 81, its own weight will prevent it from rotating and getting out of adjustment. Furthermore, on that end of the member 81 remote from the block 75 I have provided a dash pot arrangement consisting generally of a cylinder 84 which is suitably retained in an orifice in the base 70 and within which there is a body of liquid 86 and a piston and plunger arrangement 87 which are hingedly connected to the member 81 at 88. The purpose of the dash pot arrangement is to prevent the too rapid action of the weighing mechanism about the axis 76a. The second piston 89 is merely to avoid splashing of the liquid 86.

The rigidly extending arm 82 is adapted to engage one of a plurality of cam tracks which will be hereinafter more fully described.

Mounted on the upper end of the shaft 71 I have provided a platform 90 upon which are mounted four cam tracks 91, 92, 93 and 94. Cam tracks 91, 92 and 93 are adjustable while cam track 94 is fixed and is not adjustable and is of sufficient height to engage every arm 82 as it rotates about the shaft 71.

The means for adjusting the cam tracks 91, 92 and 93 are identical and consist of fixed tubular members 96 provided with slots 97. Within the tubes 96 there is a piston 98 which is provided with a lug 99 which extends through slot 97 and to which the cam track is secured. A threaded member 101 adapted to be rotated within the tubular member 96 cooperates with the piston 98 and raises and lowers the same with respect to the platform 90. It should also be noted that raising and lowering of the piston 98 raises and lowers the cam tracks 91, 92, 93 to which the particular piston 98 is affixed.

As the turret and its component egg weighing members rotate, the arms 82 will engage the cam tracks 91, 92 or at 93, or 94. As has previously been pointed out when there is no egg in the egg weighing mechanism the shaft 82 will engage the cam track 94. However, when there is an egg in the egg weighing basket 78 its weight will be sufficient to depress the egg weighing basket and to raise the arm 82 a predetermined distance, dependent upon its weight. Too rapid action of the basket is prevented by the dash-pot arrangement 84 previously referred to. As the weight of the egg swings the egg weighing basket 78 downwardly the arm 82 is elevated. However, the weight of the egg is balanced by the weight 83 whereby, depending upon the weight of the egg in the basket 78, the arm 82 will be elevated a predetermined amount. With a light egg, the arm 82 is elevated only a slight amount whereas with a heavy egg the arm 82 is raised a greater amount. It will be noted that because of the parallelogram arrangement of the yoke 76, yoke 77, the link 79 and the basket 78, the center of weight of the egg, regardless of the weight of the egg, is always correctly positioned with respect to pivot 76a. Therefore, by a proper manipulation of the weight 83, one can gauge the effect of a given weight upon the arm 82. Furthermore by operation of the threaded member 101 one can raise or lower the cam tracks 91, 92 or 93.

At this time it might again be pointed out that the purpose of this machine is to separate eggs according to their weights. It will be appreciated that when a crate of eggs is delivered to the egg plant and to this machine, it may contain eggs of all weights. Generally speaking, there are four classifications of eggs, large, medium, small and peewees. For example the large eggs are those eggs which weigh $1\tfrac{11}{12}$ ounces or over. Medium eggs are those eggs which weigh between $1\tfrac{2}{3}$ ounces and $1\tfrac{11}{12}$ ounces, whereas the small eggs are those which weigh between $1\tfrac{1}{4}$ ounces and $1\tfrac{2}{3}$ ounces. Eggs which weigh less than $1\tfrac{1}{4}$ ounces are called peewees and generally are sold in bulk and are not boxed. However, all of those eggs must be classified according to their weight and it is the purpose of this weighing turret to weigh these eggs, and deposit them at a predetermined point dependent upon their weight.

In operation the cam track 91 is raised to a point at which it will be engaged by one of the arms 82 when its corresponding egg retaining basket 78 has within it an egg which weighs $1\tfrac{11}{12}$ ounces or more, and will not be engaged by one of the arms 82 if the corresponding basket 78 contains an egg of less than that weight.

As has previously been pointed out the heavier the egg the more it will tip the balance and raise the arm 82.

As the arm 82 engages the cam track 91 it will follow the track 91 and because of the shape of the track will be urged upwardly as the turret continues to rotate. When the arm 82 reaches the highest point 91a on the cam track 91, the egg basket 78 will have been lowered to the lowermost point possible and will have lowered itself over the stationary members 105 which are adapted to cooperate with and pass through open areas in the bottom of the basket 78. The rigid members 105 will engage the egg and, as the basket 78 continues its downward movement the egg will be carried free from the basket 78 and will be caused to roll from the members 105 by virtue of their downward slope. Thus the egg will be delivered from the weighing turret to the carry-off conveyor at a point directly opposite the high point 91a of the cam track 91.

By adjusting the adjusting means which raises and lowers the cam track 92 one can raise or lower the leading edge of the cam track 92 to a position at which it engages all of those arms 82 whose corresponding egg baskets 78 contain eggs weighing more than $1\tfrac{2}{3}$ ounces. Since all eggs weighing more than $1\tfrac{11}{12}$ ounces have previously been ejected by the operation of cam track 91, it is obvious that only eggs weighing between $1\tfrac{2}{3}$ ounces and $1\tfrac{11}{12}$ ounces will be ejected by the action of cam track 92. The operation of cam track 92 upon the arms 82 which engage it and the ejectment of eggs from the cooperating baskets 78 is identical with the previously described action of cam track 91 with the exception, however, that the eggs will be discharged from the baskets 78 actuated by cam track 92, at a different point than are those eggs which are ejected from baskets actuated by cam track 91. The point of ejection of these eggs is at a point opposite the high point 92a of the cam track 92.

The action of cam track 93 is the same as has previously been described and the same may be positioned by adjustment of the positioning member 96 to which it is secured in order that that cam track will engage all arms 82 whose corresponding egg retaining baskets 78 contain an egg weighing more than 1¼ ounces. Since all eggs weighing more than 1⅔ ounces have previously been ejected by virtue of the action of cam tracks 91 and 92, it is obvious that the cam track 93 will act only upon those arms 82 whose corresponding egg baskets 78 contain eggs weighing between 1¼ ounces and 1⅔ ounces. The operation of cam track 93 is the same as the previously described operations of cam tracks 91 and 92 with the exception, however, that eggs ejected from the baskets 78 by virtue of the action of cam track 93 are ejected at a point further along the path of rotation of the egg weighing turret and at a position substantially opposite the high point 93a of the cam track 93.

In the event the eggs are of insufficient weight to raise the arm 82 to a point at which it engages one of the cam tracks 91, 92 or 93, they will be ejected from their baskets 78 by virtue of the action of the cam track 94 which is fixed and which is designed to engage every arm 82 regardless of whether the same has previously engaged one of the cam tracks 91, 92 or 93. In this manner all eggs which are received by the egg weighing turret are ejected therefrom, regardless of whether or not the cam tracks 91, 92 or 93 have become out of adjustment or whether or not there has been a failure in the operation of the egg weighing mechanism to prevent the raising or lowering of the arm 82 previous to its engagement with the cam track 94. In all probability, however, since the eggs weighing more than 1¼ ounces will have tilted their respective arms 82 to engage one of the cam tracks 91, 92 or 93 the egg will be a so-called peewee and will weigh less than the minimum of 1¼ ounces.

It will be noted that each of the cam tracks 91, 92 and 93 terminate relatively close to the high point of the following cam track whereby the egg weighing mechanisms, once they are tripped, remain at substantially completely tripped position until they have cleared the high point 94a on the cam track 94. However, when the eggs have been ejected from the egg weighing baskets 78 and the arms 82 have passed the last of the cams 91, 92, 93 or 94, the baskets 78 return to their normal positions and are advanced continuously to a point at which they are adjacent the end of the trough 41 at which point they receive another egg to be weighed.

It is possible, though not probable, that an egg may not be ejected from its backet 78 by the operation of one or more of the cam tracks 91, 92, 93 or 94. To provide against such a contingency, however, I have provided a brush member 108 which is rigidly secured to the frame of the machine and which engages every egg basket 78 as it rotates about the shaft 71. In this way every egg is cleared from the basket which retained it.

As has previously been pointed out the egg weighing mechanism, after having weighed the eggs, deposits them upon an egg removal belt. The egg removal belt consists generally of an endless belt arrangement formed of a pair of spaced parallel chains 111 and 112 which are reeved about a pair of sprockets 113 and 114 mounted upon a cross-shaft 115. At that end of the chains 111 and 112 remote from the sprockets 113 and 114 there is a corresponding shaft and sprocket arrangement, not shown, which retains the other end of the conveyor in raised position.

The entire egg removal mechanism is suitably mounted with respect to the frame and the shaft 115 and its companion, not shown, are suitably journaled within the framework.

Between the chains 111 and 112 there are a plurality of parallel spaced rubber coated cross-shafts 118 which are spaced sufficiently far apart to form egg retaining bars and yet are spaced sufficiently close together that an egg may not fall between any adjacent pair of these cross members 118.

The upper run of the conveyor member thus formed is adapted to move in a direction away from the egg weighing mechanism and thereby carry away any eggs which are deposited thereon.

As is shown in Figure 1, I have provided three substantially parallel longitudinal members 121, 122 and 123 respectively which in effect divide the carry-away conveyor into four parallel channels. Those portions of members 121, 122 and 123 which approach the egg weighing conveyor are, it will be noticed, adapted to be positioned and to be rigidly retained in a predetermined position. As is more clearly shown in Figures 1 and 6, the adjustable extension of member 121 is adapted to form a barrier which begins at a point just beyond, in the path of rotation of the turret, the point at which an egg would be ejected from one of the baskets 78 by virtue of the action of cam track 91. Therefore, any egg which is ejected from the egg weighing mechanism by virtue of the action cam track 91 will be deposited on the carry-away mechanism at a position thereon between the side edge thereof and member 121. It will be noted further that the adjustable portion of member 122 is likewise positioned at a point on the periphery of the egg weighing mechanism immediately beyond the effective point 92a of the cam track 92, whereby any egg which is ejected from the mechanism by virtue of the action of cam track 92 will be ejected in advance of the barrier 122 and after the egg weighing basket 78 has cleared the barrier 121 whereby the egg will be deposited in the channel formed by the barriers 121 and 122. In the same manner the barrier 123 is adjusted to form a channel between it and the barrier 122 to receive all eggs ejected from the mechanism by virtue of the action of the cam track 93. The remaining channel, that is between the member 123 and the side edge of the conveyor, is adapted to receive all eggs ejected from the weighing mechanism by virtue of the action of the cam track 94 or the brush 108. In this manner it will be seen that the eggs which have been weighed will be deposited upon the carry-away conveyor at a point between a pair of longitudinally extending members which form channels upon the carry-away mechanism and in which channels eggs of a predetermined weight will have been placed. The eggs are then moved by virtue of the carry-away mechanism to suitable aprons or tables from which they may be subjected to candling operations, boxing operations, etc. by an operator.

As has previously been explained, the longitudinal egg carrier, transverse or single file carrier, rotating weighing turret and carry-away conveyor are all adapted to be operated from a single drive mechanism.

The drive mechanism consists of an electric motor 130 connected to an appropriate source of electric power. On the driving shaft of the motor I have provided a pulley 131 and the vari-speed device 132 which is adapted to cooperate with the V-pulley 131.

As is known to those skilled in the art, the vari-speed device 132 operates in accordance with the belt tension upon the V-pulley 131. When the tension of the V-belt 133 is increased, the two sloping side walls 131a and 131b of the V-pulley 131 are urged apart thereby decreasing the effective diameter of pulley 131 with respect to the belt 133. When the tension upon the belt is decreased, the walls 131a and 131b of the pulley 131 approach each other and increase the effective diameter of the pulley 131 with respect to the belt 133. In order to increase or decrease the tension upon the belt 133 as previously indicated the electric motor 130 is suitably mounted upon a platform 136 which may be moved laterally by the operation of the crank 137 which operates the lead screw 138 upon which the platform 136 is mounted, thereby increasing the distance between the pulley 131 and the pulley 140 about which the belt 133 is also reeved.

As shown in Figure 4 the pulley 140 cooperates with shaft 141, one end of which cooperates with the gear box 142 and, by means of a suitable gear arrangement, drives shaft 143 and gear 74. Gear 74 cooperates with gear 73 to cause the rotation of the turret 70. As has previously been pointed out the rotation of the turret 70 is continuous.

The other end of shaft 141 cooperates with and drives gear box 146. The gear box 146 is provided with suitable gears to provide step-by-step rotation of gear 147 which drives chain 148 which in turn drives the sprocket 149 keyed to the shaft 17. As has previously been pointed out the shaft 17 is provided with sprockets 18 which are likewise keyed thereto and which engage the chains 21 and 22 causing operation of the longitudinal conveyor 33. On that end of shaft 16 remote from the sprocket 149, there is also a sprocket 151 which cooperates with a chain 152 which in turn drives a sprocket 153 on the cross-shaft 16. The two cross-shafts 16 and 17 operate to drive the longitudinal conveyor.

The gear box 146 also contains a gear train which is adapted to drive sprocket 161 in a step-by-step manner. Sprocket 161 through chain 162 likewise drives sprocket 163, cross-shaft 53 and sprocket 51 in step-by-step manner. The relationship between the rate of drive of the shaft 143, the shaft 16 and the shaft 53 is as follows: The shaft 53 is operated in a step-by-step manner by which shaft 53 stops and starts six times to every advance of the longitudinal conveyor belt 33. The shaft 53 stops and starts twelve times to every rotation of the shaft 143. In this manner it will be seen that the longitudinal conveyor will deliver one transverse row of up to six eggs into the transverse conveyor, all of which eggs will be moved from the paths of the following six eggs before they are placed upon the conveyor.

In other words, the egg marked "A" in Figure 4 will be advanced to the left as shown in Figure 4 until it is at a position to the left of the egg marked "B" in Figure 4 before the following transverse row of eggs upon the longitudinal conveyor 33 is caused to pass from the longitudinal conveyor to the transverse conveyor. While the six eggs are being advanced by the transverse conveyor the weighing turret is making one-half a revolution and presenting six baskets 78 immediately adjacent the lip 58 of the trough 41 to receive the eggs.

From the foregoing it is obvious that for every twelve steps of the transverse conveyor there will be two steps of the longitudinal conveyor and one complete rotation of the weighing device.

The carry-away conveyor may be driven by the same apparatus or may be driven by a second motor. It should be pointed out, however, that the speed of the carry-away conveyor need not be in any predetermined relationship to the speed or movement of the other elements of this device since the carry-away conveyor has only one purpose, that is, to carry away the eggs from the point on the conveyor at which they are deposited by the weighing turret to a position where they may be received by an operator. I have shown in the present instance a secondary driving unit, an electric motor 170, which drives a sprocket 171 and through a chain 172 drives a second sprocket 173 which in turn is suitably keyed to the cross-shaft 115 which, as has previously been pointed out, operates the carry-away conveyor. However, it is obvious that the carry-away conveyor can be driven from the prime mover 130 without the use of the driving mechanism 170, inasmuch as no particular speed or timed relation is required between the carry-off conveyor and the other elements of my device.

Operation of the machine may be briefly described as follows:

Electric motors 130 and 170 are connected to a suitable source of electric power. Motor 130 through pulley 131, belt 133 and pulley 140 causes rotation of shaft 141. This in turn, through gear box 142, shaft 143, and gear 144, causes the constant rotation of the weighing turret, as has previously been described, at a constant rate of speed which rate of speed is timed with the other driven units of this machine.

Rotation of shaft 141 also, through gear box 146, drives shafts 16 and 17 which advance the longitudinal or multiple file conveyor and drives sprocket 161 which advances the transverse or single file conveyor.

The gear box 146 is provided with suitable gear trains which cause intermittent or step-by-step rotation of the sprockets 147 and 161. However, sprocket 147 advances only one step for each six steps of sprocket 161 whereby the transverse or single file conveyor advances six steps for every advance step of the longitudinal conveyor.

Eggs are taken from the crate in which they are delivered to the egg packaging plant and are placed upon the upper run of the longitudinal conveyor which will be recalled, is formed of the transverse bars 29 which are provided with the spherical portions 31 which form egg retaining nests. Since the spherical members 31 are aligned both longitudinally and laterally, they will align the eggs which are placed upon the conveyor both longitudinally and laterally. Assuming that sufficient eggs are placed upon the longitudinal conveyor to completely fill the same, it will be obvious that there will be a plurality of transverse rows of eggs, each of which transverse row contains six eggs. Since the longitudinal conveyor is advanced step-by-step it will also be obvious that one transverse row of (or six) eggs will be transferred therefrom at a time and at each step of the same.

When one transverse row of eggs is delivered from the longitudinal or multiple file conveyor to the transverse or single file conveyor, the eggs will have passed between vertical members 37 which have straightened the eggs within the nests created by the spherical members 31.

As has been previously pointed out the transverse or single file conveyor consists of a trough 41 along which the eggs are adapted to be rolled by a plurality of pusher members 44. The pusher members 44 are advanced by the rotation of the sprocket 161 through chain 162 and sprocket 163 in step-by-step manner. At the time the eggs are delivered from the longitudinal or multiple file conveyor to the trough 41, the pushers 44 are motionless and are aligned with the vertical members 37. When the eggs have been deposited between the pushers 44 the transverse or single file conveyor is caused to operate and will advance six steps, thereby clearing the trough 41 sufficiently for the next deposit thereon of another transverse row of six eggs from the longitudinal conveyor.

As the eggs are ejected from the transverse or single file conveyor over the end 58 of the trough 41 they are deposited in egg weighing baskets 78 upon the rotating turret 70. When the eggs are deposited in the egg weighing basket 78 their weight tends to overcome the effect of the member 83 and to cause the entire egg weighing mechanism to pivot about the points 76a. The egg and the basket 78 holding the same will drop a predetermined amount, depending upon the weight of the egg, thereby raising the arm 82 which, upon further rotation of the turret, will engage one of the cam tracks 91, 92, 93 or 94. When the arm 82 engages one of the cam tracks previously referred to, it will be further elevated causing a similar lowering of the basket 78. As the basket 78 is lowered the egg therein will engage members 105 and be lifted clear of the still dropping basket 78. As the eggs come to rest upon the members 105 they will roll clear of the same by virtue of the fact the members 105 are turned downwardly. After the egg rolls clear of the members 105 it will come to rest upon the carry-off conveyor in one of the four channels thereof, depending upon the weight of the egg, as has previously been described.

I claim:

1. In an egg grading machine, a movable endless multiple file conveyor, means to align eggs both longitudinally and laterally thereon, said means consisting of a plurality of spherical members which are aligned laterally and longitudinally and between which eggs may be deposited, means for straightening eggs on said multiple file conveyor consisting of alternate long and short fixed vertical members adapted to engage eggs which are not in straight position, a single file conveyor adjacent the discharge end of said multiple file conveyor comprising a fixed trough and movable means for rolling eggs along said trough, an egg weighing and discharging mechanism adapted to receive eggs from said single file conveyor comprising a rotating turret provided with a plurality of pivoted egg weighing baskets, arms associated with said baskets, means for adjusting said baskets whereby eggs of a predetermined weight will elevate said arms a predetermined amount, a plurality of fixed cam tracks and means for adjusting said cam tracks to engage certain of said arms which have been elevated a predetermined amount and lower said baskets about their respective pivots, a plurality of fixed members over which said baskets are lowered and which are adapted to engage said eggs and cause the same to be discharged from said baskets, and a common drive mechanism adapted to advance said multiple file conveyor one step for each six steps of said single file conveyor and adapted to rotate continually said turret.

2. In an egg grading machine, a multiple file conveyor, means adapted to align eggs both longitudinally and laterally thereon, consisting of a plurality of spherical members which are aligned laterally and longitudinally, means for straightening eggs on said multiple file conveyor consisting of alternate long and short fixed members overlying one end of said conveyor adjacent the discharge end thereof, a single file conveyor adjacent the discharge end of said multiple file conveyor comprising a trough and means for rolling eggs along said trough, an egg weighing and discharging mechanism adapted to receive eggs from said single file conveyor comprising a rotating turret provided with a plurality of pivoted egg weighing baskets, arms associated with said baskets, means for weighting said baskets whereby eggs of a predetermined weight will elevate said arms a predetermined amount, a plurality of fixed cam tracks and means for adjusting said cam tracks to engage certain of said arms which have been elevated a predetermined amount, and which are advanced by the rotation of said turret, a plurality of fixed members over which said baskets are lowered because of the cooperation of said arms and said cam tracks and which are adapted to engage said eggs and cause the same to be discharged from said baskets, and a common drive mechanism adapted to advance said multiple file conveyor one step for each six steps of said single file conveyor and adapted to rotate continually said turret and said egg weighing baskets.

3. In an egg weighing mechanism, a rotating turret, parallelogram means including balance arms pivotally attached to said turret, an egg carrying basket pivotally attached to each of said parallelogram means, an adjustable balance weight movable along said balance arms for adjusting the position of said baskets whereby the various weights of eggs will elevate the end of said arms opposite the end to which baskets are attached a predetermined distance, a plurality of adjustable cam tracks adapted to engage the end of said balance arms opposite the end to which the egg carrying baskets are attached and then to elevate the ends a predetermined distance thereby to lower said baskets, said parallelogram means serving to maintain said baskets in an egg retaining position as the baskets are lowered, and means for discharging the eggs from the baskets when the ends of the balance arms engaging the cam tracks have reached their highest positions.

4. In an egg weighing device, a vertical stationary spindle, a rotatable platform mounted upon said spindle and adapted to be continuously rotated with respect thereto, a plurality of scale and basket assemblies mounted upon said platform and equally spaced about its periphery, the baskets being mounted at the outer ends of a pivotally mounted balance beam, the other ends of said balance beams accommodating balance weights, cam engaging means mounted on said balance beams, a plurality of cam tracks mounted upon said spindle in the path of rotation of said cam engaging means and adapted to engage the same to tip the balance beams from the horizontal and means for discharging the eggs from said baskets when said cam engaging means reaches their highest point of travel on said cam tracks.

5. In an egg weighing device, a vertical stationary spindle, a rotatable platform mounted upon said spindle and adapted to be continuously rotated with respect thereto, a plurality of scale and basket assemblies mounted upon said platform and equally spaced about its periphery, the baskets being pivotally mounted at the outer end of parallelogram means including a pivotally mounted balance beam, the other end of said balance beam accommodating balance weights, cam engaging means mounted on said balance beams, a plurality of cam tracks mounted upon said spindle in the path of rotation of said cam engaging means and adapted to engage the same to tip the balance beams from the horizontal, said parallelogram means maintaining said baskets in an egg retaining position as the baskets are lowered, means for damping the motion of said balance beam attached to said balance beam and said platform, and means for discharging the eggs from said basket when said cam engaging means reaches their highest point of travel on said cam tracks.

6. A device as in claim 5 together with means for adjusting the position of said cam tracks comprising slotted tubular members fixed to said spindle, a piston slidably mounted within each of said tubular members, each of said pistons being provided with a lug extending through the slots in said tubular members, said cam tracks being mounted on said lugs, a rotatable threaded member extending axially into each of said tubular members and engaging said piston whereby when said threaded members are rotated, said piston will be raised or lowered to thereby raise or lower the position of said cam tracks.

7. In an egg grading machine, a movable endless multiple file conveyor comprising means to align eggs both longitudinally and laterally thereon to thereby deliver rows of aligned eggs at predetermined intervals at one end thereof, a single file conveyor adjacent the discharge end of said multiple file conveyor comprising a fixed trough and movable means for rolling eggs along said trough, an egg weighing and discharging mechanism adapted to receive eggs from said single file conveyor comprising a rotating turret provided with a plurality of pivoted egg weighing baskets, balance arms associated with said baskets, means for adjusting the position of said baskets whereby eggs of a predetermined weight will elevate the other end of said arms a predetermined distance, a plurality of adjustable cam tracks adapted to engage certain of said arms which have been elevated a predetermined amount to thereby lower said baskets, and means for discharging the eggs from said baskets when said baskets have reached their lowermost point of travel, and a common drive mechanism adapted to advance the multiple file conveyor one step for a predetermined amount of steps of said single file conveyor and adapted to rotate said turret.

8. In an egg grading machine, a multiple file conveyor comprising means to align eggs both longitudinally and laterally thereon to thereby allow the discharge of aligned rows of eggs from the discharge end of said multiple file conveyor, a single file conveyor adjacent the discharge end of multiple file conveyor and adapted to receive rows of eggs comprising a trough and means for rolling eggs along said trough, an egg weighing and discharging mechanism adapted to receive eggs from said single file conveyor comprising a rotating turret, a plurality of parallelogram means including balance means pivotally mounted on said turret, a plurality of egg carrying baskets mounted on the outer end of said balance beams, balance weights mounted on the other end of said balance beams whereby eggs of a predetermined weight will elevate one end of said balance beams a predetermined amount, cam engaging members fixed to said balance beams, a plurality of fixed cam tracks and means for adjusting the position of said cam tracks to engage certain of said beams which have been elevated a predetermined amount whereby upon rotation of said turret said baskets will be lowered, said parallelogram means serving to retain said baskets in an egg retaining position while they are being lowered, and means for discharging the eggs from said baskets when said baskets reach their lowermost point of travel, and a common drive mechanism adapted to advance said multiple file conveyor one step for a predetermined quantity of steps of said single file conveyor and adapted to rotate said turret.

References Cited in the file of this patent

UNITED STATES PATENTS

| Number | Name | Date |
|---|---|---|
| 1,044,070 | Mower | Nov. 12, 1912 |
| 1,169,467 | Cutler | Jan. 25, 1916 |
| 1,614,586 | Anderson | Jan. 18, 1927 |
| 1,875,423 | Daniels | Sept. 6, 1932 |
| 1,891,807 | Frost | Dec. 20, 1932 |
| 1,954,164 | Wyland | Apr. 10, 1934 |
| 2,003,561 | Studley et al. | June 4, 1935 |
| 2,020,511 | McHenry | Nov. 12, 1935 |
| 2,070,980 | Wyland | Feb. 16, 1937 |
| 2,092,109 | Dodge | Sept. 7, 1937 |
| 2,112,259 | Wyland | Mar. 29, 1938 |
| 2,139,574 | Butterfield | Dec. 6, 1938 |
| 2,178,203 | Fausel | Oct. 31, 1939 |
| 2,355,715 | Eddington | Aug. 15, 1944 |
| 2,436,534 | Tolley | Feb. 24, 1948 |
| 2,451,836 | Jordan | Oct. 19, 1948 |
| 2,456,031 | Spain | Dec. 14, 1948 |
| 2,461,308 | Brown | Feb. 8, 1949 |
| 2,531,292 | Page | Nov. 21, 1950 |

FOREIGN PATENTS

| Number | Country | Date |
|---|---|---|
| 478,971 | Germany | June 20, 1929 |
| 504,057 | Great Britain | Apr. 19, 1939 |
| 585,304 | Germany | Oct. 2, 1933 |